United States Patent [19]

Horsman

[11] Patent Number: 5,685,130
[45] Date of Patent: Nov. 11, 1997

[54] METHOD AND APPARATUS FOR CONTINUOUSLY SUPPLYING PRODUCT TO AN INTERMITTENTLY OPERATING VACUUM PACKAGING MACHINE

[75] Inventor: Dennis P. Horsman, Overland Park, Kans.

[73] Assignee: Multivac, Inc., Kansas City, Mo.

[21] Appl. No.: 423,373

[22] Filed: Apr. 18, 1995

[51] Int. Cl.$^6$ ............................................. B65B 31/00
[52] U.S. Cl. ............................. 53/510; 53/493; 53/55
[58] Field of Search ..................... 53/510, 511, 493, 53/496, 497, 55; 198/571, 575, 577, 579

[56] References Cited

U.S. PATENT DOCUMENTS

| | | | |
|---|---|---|---|
| 3,827,545 | 8/1974 | Buhayar | 198/579 |
| 4,341,334 | 7/1982 | Bier | 198/575 |
| 4,360,098 | 11/1982 | Nordstrom | 198/579 |
| 4,514,963 | 5/1985 | Bruno | 53/493 |
| 4,525,977 | 7/1985 | Matt | 53/55 |
| 4,640,408 | 2/1987 | Eaves | 198/577 |
| 4,909,018 | 3/1990 | Yamamoto | 53/493 |
| 5,097,939 | 3/1992 | Shanklin et al. | 198/577 |
| 5,123,231 | 6/1992 | Fallas et al. | 53/493 |
| 5,419,099 | 5/1995 | Mueller et al. | 53/55 |

*Primary Examiner*—Lowell A. Larson
*Assistant Examiner*—Ed Tolan
*Attorney, Agent, or Firm*—Shook, Hardy & Bacon L.L.P.

[57] ABSTRACT

A method and apparatus are provided for continuously supplying product to a machine for intermittently performing work on at least one product. The apparatus comprises a loading conveyor, a continuous drive motor operably coupled to the loading conveyor for moving the loading conveyor at a substantially constant loading speed, a transfer conveyor positioned adjacent the loading conveyor and adapted to receive product therefrom, a low speed drive for moving the transfer conveyor at a predetermined low speed to receive product from the loading conveyor, a high speed drive for moving the transfer conveyor at a high second speed relatively greater than the low speed to the machine, and a controller for operating the low speed and high speed drives in sequence so that the low speed drive is activated to receive product from the loading conveyor at low speed, and the high speed drive is activated to transfer the product to the machine at high speed.

25 Claims, 5 Drawing Sheets

METHOD AND APPARATUS FOR CONTINUOUSLY SUPPLYING PRODUCT TO AN INTERMITTENTLY OPERATING VACUUM PACKAGING MACHINE

BACKGROUND OF THE INVENTION

This invention relates to vacuum packaging technology and, more particularly, to a method and apparatus for continuously supplying product to an intermittently operating vacuum packaging machine.

Vacuum packaging machines seal product in a reduced pressure environment within an air tight package. Most vacuum packaging machines are modular systems having two or more stations positioned along a conveyor for performing various tasks relating to vacuum sealing a supply of product. The manner by which vacuum packaging machines seal product separates them into two categories: continuously operating machines and intermittently operating machines.

Continuously operating vacuum packaging machines, or continuous machines as they are sometimes identified in the industry, vacuum seal product on a constant, synchronous basis. Product or containers holding product are fed into the continuously operating machine by a conveyor or similar mechanism in a constant stream. The individual products are then consecutively sealed at the sealing station with no dwell time and at approximately the same time increments as they were loaded.

Continuous machines are advantageous mainly because they are relatively easy to operate. The operator of a continuous machine can, as the name would imply, continuously supply product to the machine at a relatively constant rate with little prior training and supervision, thereby providing a tangible economic benefit. Continuous machines are also desirable because their operation rates can be quite high, depending upon the nature of product to be sealed.

Continuous machines are not used to seal products requiring significant dwell time. Many products, and particularly those requiring deep formed packages, require significant dwell time at the sealing station to ensure sufficient time to form the container and evacuate the atmosphere from within the package to inhibit contamination and/or spoilage. The evacuation die of the intermittent machine dwells periodically to form the container and seal product, thereby momentarily halting the procession of product through the machine. Thus, the user of an intermittent machine intermittently loads product into the sealing station only after the dwell cycle of the die has been completed.

The primary advantage of intermittent machines is their ability to vacuum seal products that require significant dwell time during the sealing phase. Intermittent machines can therefore be used to vacuum seal products which are impractical or inefficient to seal with continuous machines. In addition, some intermittent machines can be configured so that the evacuation die simultaneously seals a plurality of products, thereby significantly increasing the operation rate of the machine.

Unfortunately, most intermittent machines existing in the art require that the user manually load and align the product before each dwell phase. The time expense and at least perceived complexity of this loading procedure has caused some in the packaging industry to be reluctant to purchase and use intermittent machines if the product is one which can be sealed on a continuous machine. Furthermore, when the machine is engineered to simultaneously seal a plurality of containers, it is necessary that all or nearly all of the product be simultaneously loaded for advancement to the sealing station. This mass loading requires additional training and supervision which reduce operation efficiency. Finally, considering the intermittent machine's loading procedure, the maximum operation rate of the machine is sometimes unrealized due to user loading limitations.

SUMMARY OF THE INVENTION

It is, therefore, an object of the present invention to provide a method and apparatus for continuously loading an intermittently operating machine which combine the convenience and simplicity of continuous loading with the efficiency and speed of intermittent operation.

More particularly, it is an object of the present invention to provide a method and apparatus for continuously supplying product to a machine which intermittently performs work on at least one product utilizing a loading system having a first moving surface for receiving a continuous supply of products and a second moving surface for intermittently transferring the products to the machine.

It is a further object of the present invention to provide a method and apparatus for continuously supplying containers to an intermittently operating vacuum packaging machine utilizing a loading conveyor for receiving a continuous supply of containers and a transfer conveyor having a low speed for receiving containers from the loading conveyor, and a high speed for intermittently transferring the containers to the machine.

It is yet another object of the present invention to provide a method and apparatus for continuously loading product into an intermittently operating machine that may be used under a variety of circumstances and on a wide range of products in an efficient and user friendly manner.

To accomplish these and other related objects of the invention, the present invention relates to a method and apparatus for continuously supplying containers to an intermittently operating vacuum packaging machine, the machine comprising a loading conveyor, a continuous drive motor operably coupled to the loading conveyor for moving the loading conveyor at a substantially constant loading speed, a transfer conveyor positioned adjacent the loading conveyor and adapted to receive product therefrom, a low speed drive for moving the transfer conveyor at a predetermined low speed to receive product from the loading conveyor, a high speed drive for moving the transfer conveyor at a high speed relatively greater than the low speed to move product to the machine, and a controller for operating the low speed and high speed drives in sequence so that the low speed drive is activated to receive product from the loading conveyor at low speed, and the high speed drive is activated to transfer the product to the machine at high speed.

BRIEF DESCRIPTION OF THE DRAWINGS

The accompanying drawings form part of the specification and are to be read in conjunction therewith. Numbers have been used in the following views to indicate like parts described herein:

FIGS. 8–14 are temporally progressive illustrations of the product loading apparatus of the present invention shown in use for simultaneously vacuum sealing a unit of six containers, arranged in side-by-side longitudinal rows of three containers each, only one such unit being shown;

DESCRIPTION OF THE PREFERRED EMBODIMENT

Figure 1:
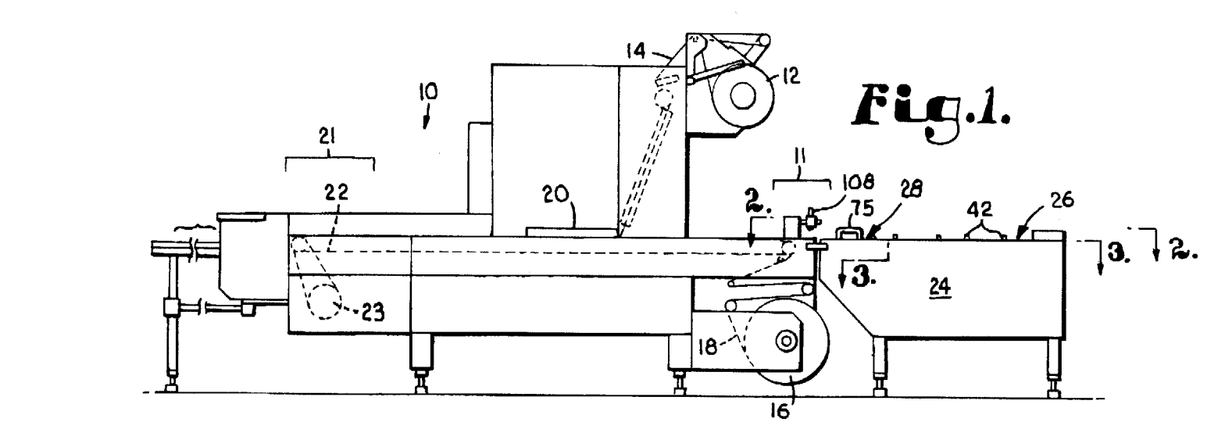
FIG. 1 is a schematic side elevational view of an intermittent operating vacuum packaging machine equipped with an apparatus constructed in accordance with the present invention for continuously feeding product into the machine.

Turning now to the drawings in greater detail and initially to FIG. 1, an intermittent operating vacuum packaging machine utilizing the product loading apparatus of present invention is broadly designated by the numeral 10. Machine 10 includes a container receiving region 11, an upper film web supply 12 for dispensing an upper film web 14, a lower film web supply 16 for dispensing a lower film web 18, a sealing station 20, a separating station 21, a machine conveyor 22 and a machine conveyor motor 23.

The continuous loading apparatus of the present invention, broadly designated in FIG. 1 by the numeral 24, is positioned adjacent machine 10 at the container receiving region 11. Apparatus 24 may be mounted directly to machine 10 or may be free-standing adjacent region 11. Apparatus 24 essentially comprises two components: a loading station 26 and a transfer station 28.

Figure 2:
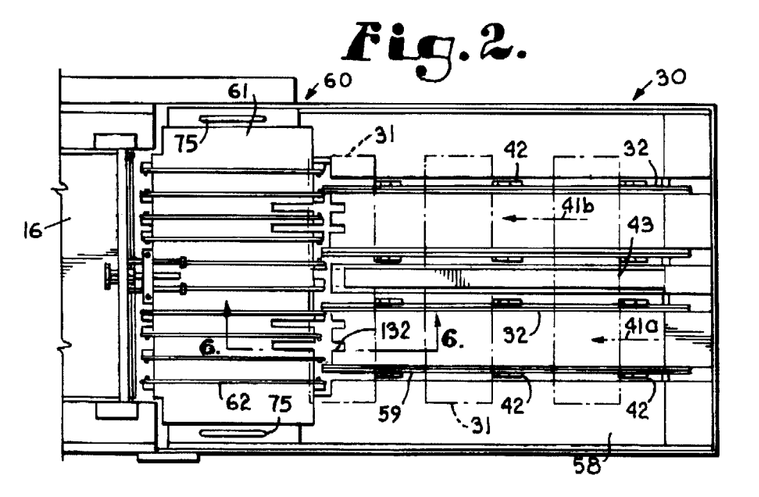
FIG. 2 is an enlarged fragmentary top plan view of the product loading apparatus mounted to the machine in FIG. 1, taken along line 2—2 in FIG. 1 in the direction of the arrows, showing the loading conveyor and the transfer conveyor of the apparatus of the present invention arranged in side-by-side longitudinal lanes.
Figure 4:
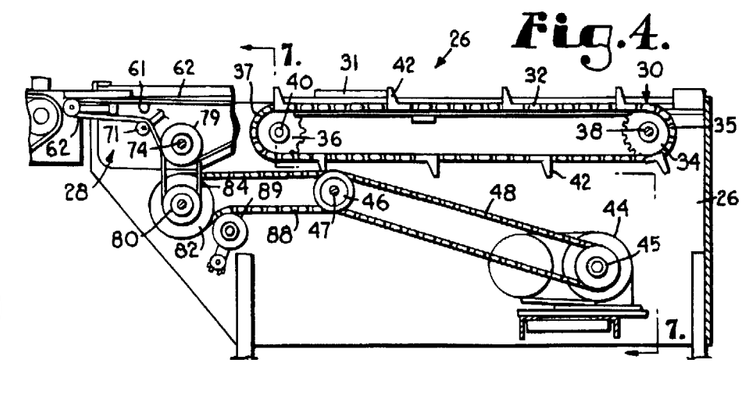
FIG. 4 is an elevational view of the apparatus shown in FIG. 3, taken in vertical section along line 4—4 of FIG. 3 in the direction of the arrows, illustrating the low speed drive of the transfer conveyor and its manner of engagement with the continuous drive of the loading conveyor, and further showing the chain system of the loading conveyor having equally spaced apart flights for pushing containers along the loading conveyor.

Referring now to FIGS. 2 and 4, loading station 26 comprises a loading conveyor 30 for receiving and moving a continuous supply of containers 31, shown in phantom lines in FIG. 2, or any other products or goods. Conveyor 30 may comprise any moving surface or mechanism capable of transporting containers 31 across loading station 26. In the preferred embodiment, conveyor 30 comprises four chains 32 spanning substantially the length of loading station 26 and trained around respective front sprockets 34, located at the front portion 35 of loading conveyor 30, and rear sprockets 36, located at the rear portion 37 of conveyor 30. Each of the four front sprockets 34 is mounted to a front sprocket axle 38 and each of the four rear sprockets 36 is mounted to a rear sprocket axle 40. Both axles 38 and 40 are mounted transversely within station 26 for rotational movement about their respective axes.

Each chain 32 includes one or more upraised structures, such as flights 42 in FIG. 4, for moving containers 31 through station 26. A plurality of flights 42 are pivotally mounted to each chain 32 at substantially equal intervals. It is understood, however, that conveyor 30 may function satisfactorily without flighting 42 or other supplemental structures, provided containers 31 sufficiently contact chains 32 for frictional engagement.

Loading station 26 further includes two side-by-side longitudinal lanes 41a and 41b (FIG. 2) for moving containers 31 along loading conveyor 30. As best seen in FIG. 2, longitudinal lanes 41a and 41b are separated by a push bar 43 against which containers 31 are positioned for proper alignment. It should be noted that additional lanes may be employed as circumstances require and, consequently, such additional lanes are within the scope of the present invention.

Referring now to FIG. 4, a continuous drive motor 44 for driving loading conveyor 30 is shown. Motor 44 may be any power source capable of providing sufficient mechanical power for driving conveyor 30, but is preferably an electrical motor. Motor 44 has a power take-off 45 operably coupled to a power gear 46, which is affixed to a continuous drive shaft 47 for rotation therewith. Power take-off 45 is operably coupled to gear 46 by a power chain 48.

Figure 3:
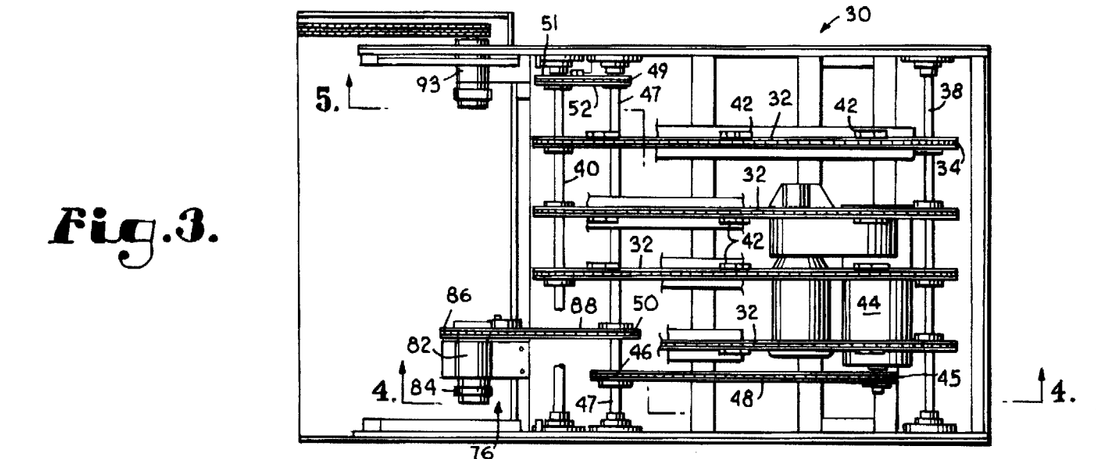
FIG. 3 is an enlarged top plan view of the product loading apparatus, taken along line 3—3 of FIG. 1 in the direction of the arrows, showing the loading conveyor and the constant drive of the apparatus, and also illustrating the manner of engagement of the continuous drive with the low speed drive of the transfer conveyor.

Continuous drive shaft 47 is mounted for axial rotation within loading station 26 at a position below loading conveyor 30. As best illustrated in FIG. 3, drive shaft 47 spans transversely across the width of loading station 26 and includes a loading conveyor drive gear 49 and a transfer conveyor drive gear 50, both being mounted to shaft 47 for rotation therewith.

Figures 5, 7:
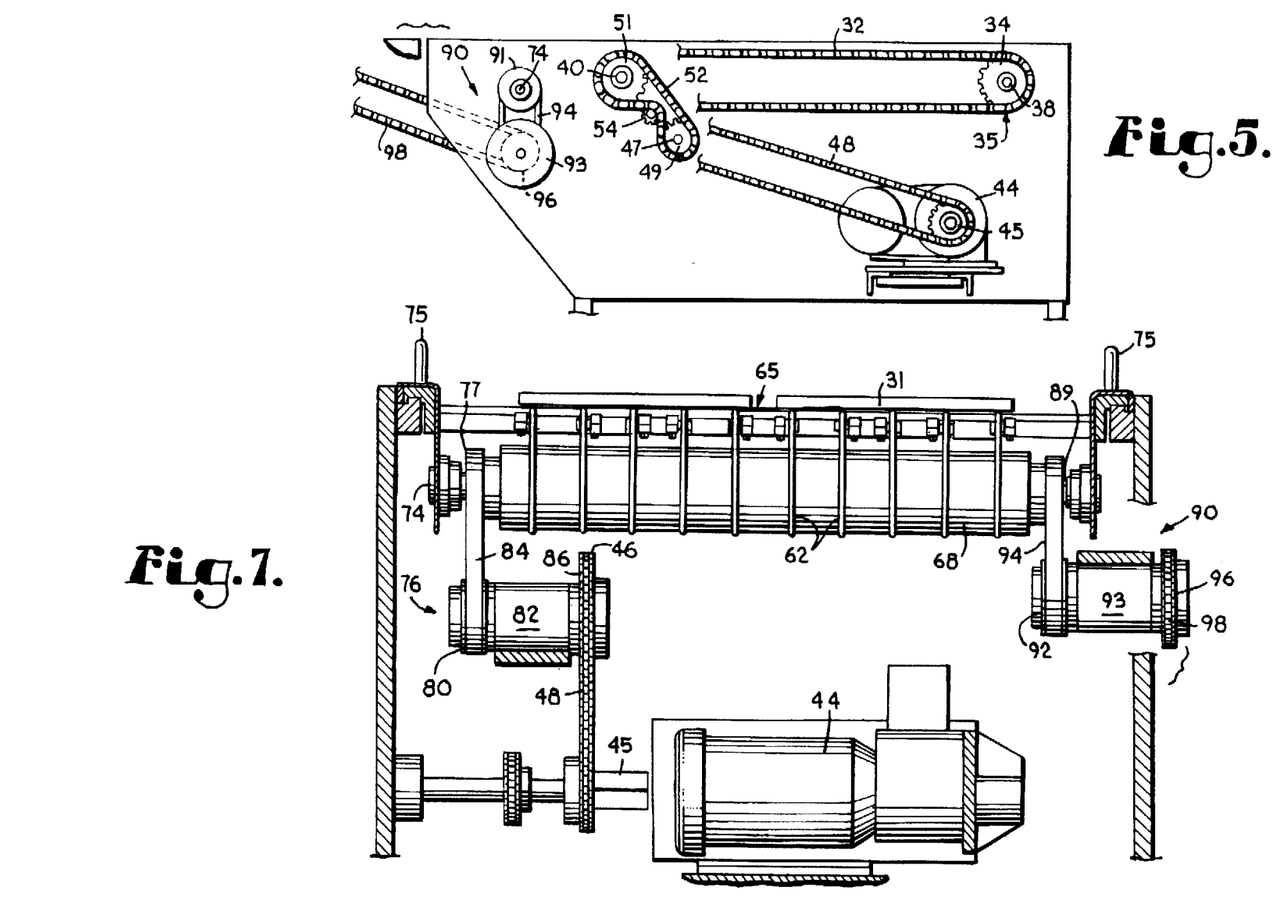
FIG. 5 is an elevational view of the apparatus shown in FIG. 3, taken in vertical section along line 5—5 of FIG. 3 in the direction of the arrows, showing the manner of engagement of the loading conveyor with the continuous drive and also partially showing, fragmentarily and in phantom lines, the manner of engagement of the high speed drive of the transfer conveyor to the machine (not shown)
FIG. 7 is an enlarged fragmentary elevational view of the apparatus of the present invention, taken in vertical section along line 7—7 in FIG. 4 in the direction of the arrows, showing the continuous drive of the loading conveyor and its engagement with the low speed drive of the transfer conveyor, and also partially showing the high speed drive of the transfer conveyor.

Turning to FIG. 5, loading conveyor drive gear 49 is operably coupled to a loading conveyor drive sprocket 51 on front axle 40 by a loading conveyor drive chain 52. It is preferred that a tension sprocket 54 be employed to promote a more secure engagement of gear 49 and sprocket 51 to drive chain 52.

A cover plate 58 is placed atop conveyor 30 to provide a surface upon which containers 31 may be moved and to prevent direct contact between the conveyor chains 32 and containers 31. As shown in FIG. 2, a plurality of plates 58 are spaced apart to provide longitudinal openings 59 through which flights 42 project and move. Plates 58 are configured to allow flights to project above plates 58 to engage and push containers 31 along conveyor 30. Plates 58 should present a relatively low coefficient of surface friction to allow containers 31 to slide thereon with relatively little resistance.

Figure 6:
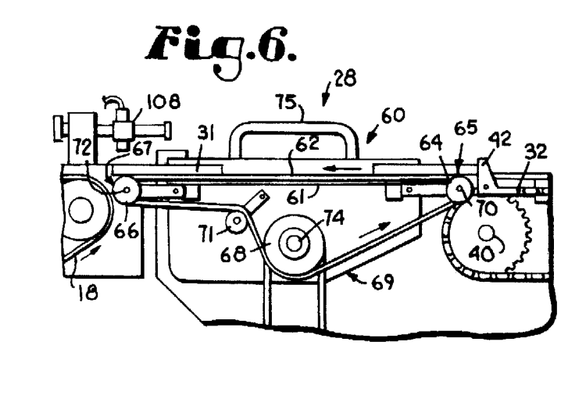
FIG. 6 is an enlarged fragmentary elevational view of the transfer conveyor shown in FIG. 2, taken in vertical section along line 6—6 in FIG. 2 in the direction of the arrows, showing the drive belt movement of the transfer conveyor and its relative spatial relationship with the other components of the apparatus.

With reference now to FIGS. 2 and 6, transfer station 28 comprises a transfer conveyor 60 spanning approximately the length of transfer station 28 for receiving containers 31 from loading conveyor 30 and moving the containers 31 to receiving region 11 of machine 10. Conveyor 60 may comprise any moving surface or mechanism capable of transporting containers 31 across transfer station 28. As best seen in FIG. 6, transfer conveyor 60 includes support surface 61 and a plurality of rope conveyors 62 overlying surface 61. Each rope 62 is trained around a lead pulley 64 disposed at the lead portion 65 of transfer conveyor 60, a back pulley 66 disposed at the back portion 67 of the conveyor 60, and a drive roller 68 disposed at the bottom 69 of conveyor 60. Roller 68 is provided with grooves (not shown) for receiving ropes 62 so as to preclude lateral movement of ropes 62 relative to the roller surface.

Support surface 61 substantially completely overlies transfer conveyor 60. Surface 61 functions to protect underlying components and to support ropes 62 as they carry containers 31 across transfer conveyor 60. Surface 61 is removably fastened to conveyor 60 for ease in maintenance and repair of conveyor 60 components thereunder. Surface 61 may be constructed of any rigid material having a low coefficient of surface friction to allow ropes 62 to slide across the surface with little resistance. Ropes 62 may be constructed of any flexible material, such as rubber, having a relatively high coefficient of surface friction to promote frictional engagement between the ropes and the bottom surfaces of containers 31.

With continued reference to FIG. 6, each lead pulley 64 is mounted to a lead pulley axle 70 and each back pulley 66 is mounted to a back pulley axle 72. Pulleys 64 and 66 may be mounted for rotation about their respective axles, 70 and 72. Drive roller 68 is affixed to a drive axle 74 which rotates to impart movement to ropes 62. Axles 70, 72 and 74 are transversely mounted within transfer station 28.

It is preferable to employ a series of tension pulleys 71 in connection with transfer conveyor 60, as seen in FIG. 7. Each tension pulley 71 is mounted to contact the outer surface of an associated rope 62 and thereby promote greater frictional engagement between rope 62 and drive roller 68.

Apparatus 24 may be constructed so that transfer conveyor 60 can be dismantled and removed from apparatus 24 for repair and maintenance purposes. To meet this end, a pair of handles 75 may be mounted to transfer conveyor 60 at opposed sides of station 28 so that conveyor 60 can be removed from apparatus 24.

Transfer conveyor 60 further comprises a low speed drive, broadly designated by the numeral 76. As seen in FIG. 4, low speed drive 76 includes a low speed drive pulley 79 secured to a first end 77 of the drive roller axle 74. Low speed drive pulley 79 is operably coupled to the output pulley 80 of a low speed clutch 82 by a belt 84. The input gear 86 (FIG. 3) of low speed clutch 82 is operably coupled to the transfer conveyor drive gear 50 at loading station 26 by a low speed power chain 88. A tension sprocket 89, shown in FIG. 4, is employed to bias against the outer surface of chain 88, thereby promoting secure engagement of chain 88 with gear 86.

Low speed clutch 82 is an overriding clutch of conventional design well-known in the art. It is operable to disengage the drive train of low speed drive 76 whenever the speed of drive axle 74 exceeds a predetermined maximum value without interrupting operation of motor 44. Low speed clutch 82 will reengage the drive 76 when the speed of drive axle 74 falls below the predetermined value.

Transfer conveyor 60 also includes a high speed drive, broadly designated in FIGS. 5 and 7 by the numeral 90. High speed drive 90 includes a high speed drive pulley 91 (FIG. 5) secured to a second end 89 of axle 74. High speed drive pulley 91 is operably coupled to output pulley 92 of high speed clutch 93 by a high speed drive belt 94. Input gear 96 of high speed clutch 93 is operably engaged to machine conveyor motor 23 of machine 10 by a high speed power chain 98.

Like low speed clutch 82, high speed clutch 93 is also an overriding clutch of conventional design well-known in the art. High speed clutch 93 is operable to disengage the drive train of high speed drive 90 whenever the speed of axle 74 falls below a predetermined value and the axle is thus being driven by low speed drive 76.

While it is preferred that low speed and high speed drives 76 and 90 utilize distinct power sources, it is possible to incorporate a single drive assembly to alternately selectively drive transfer conveyor 60 at low and high speeds. It is also contemplated that one or both of drives 76 and 90 could employ completely independent power sources, rather than being coupled with either the loading conveyor drive or the machine conveyor drive.

Figure 16:
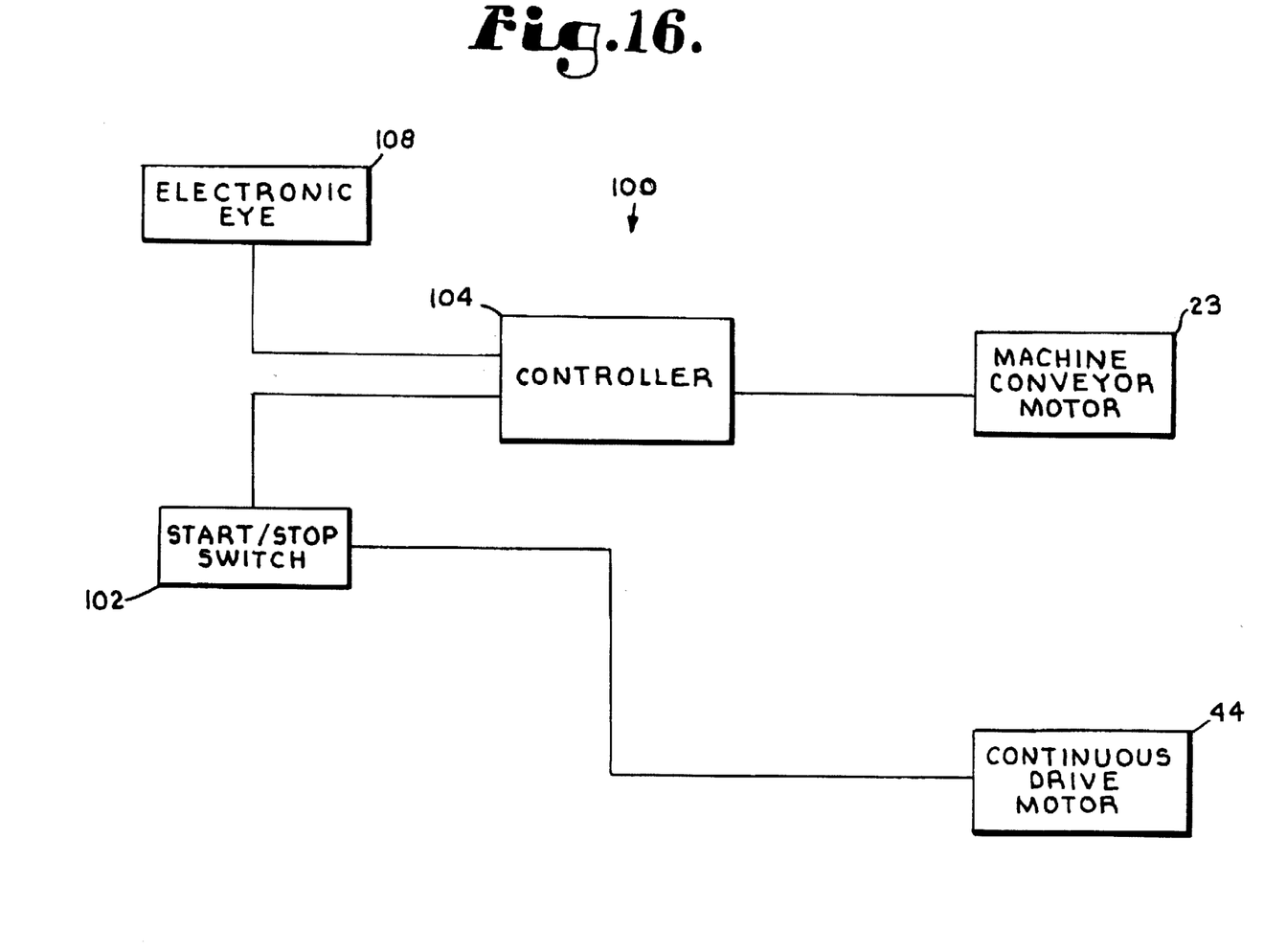
FIG. 16 is a schematic of the control circuit of the present invention which coordinates its operation.

The operation of the apparatus 24 of the present invention is preferably automated, but may also be controlled manually by the user. A simplified control circuit of apparatus 24 is shown in FIG. 16 and is represented broadly by the numeral 100. Control circuit 100 includes a start/stop switch 102, a controller 104, and electronic eye 108, all connected through appropriate leads with machine conveyor motor 23 and continuous drive motor 44.

The controller 104 may be a hard-wired logic circuit, a microprocessor or other equivalent means for activating and deactivating the components of the various stations of apparatus 24. Preferably, controller 104 includes a microprocessor that has been preprogrammed to activate and deactivate the components of the various stations in response to signals indicating the location of product on the conveyors 30 and 60. To meet this end, an electronic eye 108 is mounted at the container receiving region 11 of machine 10 for detecting the presence or absence of containers 31 at a specific position on transfer conveyor 60. Electronic eye 108 also includes associated circuitry for connection with controller 104 for activating and deactivating low speed drive 76, high speed drive 90 and machine conveyor motor 23.

In operation, switch 102 activates continuous drive motor 44 which moves loading conveyor 30 at a constant loading speed from front 35 to rear 37 (right to left in FIG. 4). This also activates the low speed drive 76 of transfer conveyor 60, which moves conveyor 60 at low speed from leading portion 65 to back portion 67. Drive motor 44 thus initially supplies power for both the loading conveyor 30 and the low speed drive 76 of the transfer conveyor 60.

Once loading conveyor 30 starts moving the user continuously loads containers 31 onto the two longitudinal lanes 41a and 41b which are separated by a push bar 43. The most efficient operation requires two users, one positioned at each side of the conveyor 30 to load their respective lane by positioning containers 31 against the push bar 43 between flightings 42. This loading process is conducted continually at a constant rate as the machine 10 operates.

Figure 8:
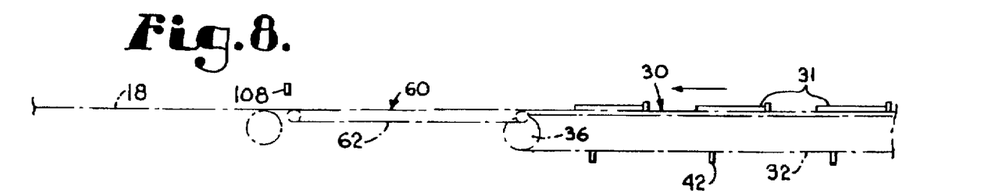
FIG. 8 shows three containers of one row of the unit loaded onto the loading conveyor and progressing toward the transfer conveyor in the direction of the arrow.
Figure 9:
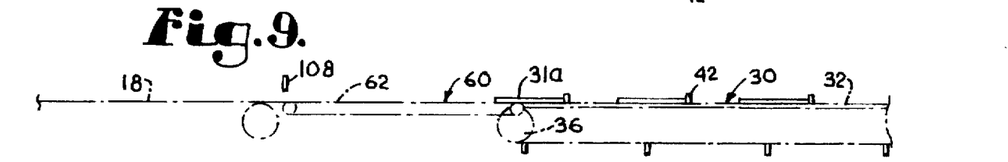
FIG. 9 depicts the containers in FIG. 8 being conveyed by the loading conveyor at a loading speed toward the transfer conveyor, which is moving at a predetermined low speed to receive containers from the loading conveyor at appropriate intervals, the first container of the unit being in partial contact with the transfer conveyor.
Figure 10:
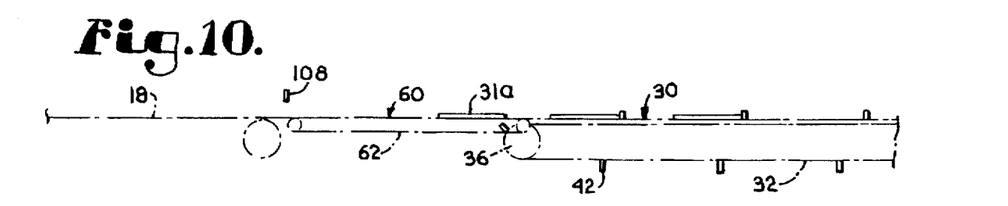
FIG. 10 shows the first container of the unit fully on the transfer conveyor and the second container approaching the transfer conveyor at the loading speed.
Figure 11:
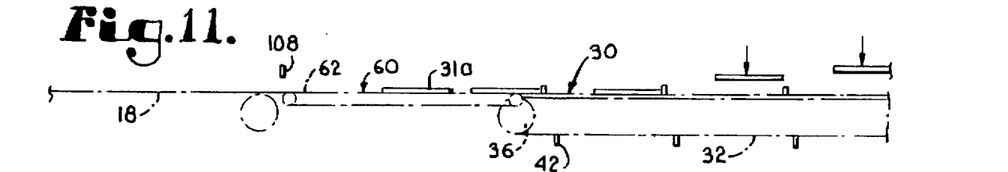
FIG. 11 illustrates the second container of the unit being received partially onto the transfer conveyor and also showing two additional containers of the following unit being placed on the loading conveyor.

FIG. 8 depicts loading conveyor 30 having containers 31 holding product fully loaded onto one lane 41a. As the chains 32 of conveyor 30 rotate forwardly in the direction of the arrows, flightings 42 push the containers toward transfer conveyor 60. While containers 31 are moved by conveyor 30 in the direction of transfer conveyor 60 at loading speed, low speed drive 76 is moving the transfer conveyor 60 at a predetermined low speed so that the containers 31 may be smoothly received onto the transfer conveyor 60, as seen in FIGS. 9-11, and spaced at appropriate intervals for subsequent vacuum sealing by sealing station 20. Through geared reduction, the low speed of transfer conveyor 60 is approximately one-half to three-quarters the loading speed of loading conveyor 30 so as to reduce the spacing between containers 31 on conveyor 60 for proper alignment at sealing station 20. It should be noted, however, that other variances in the relative speeds of conveyors 30 and 60 may be desirable in some cases and is therefore within the scope of the present invention.

Figure 12:
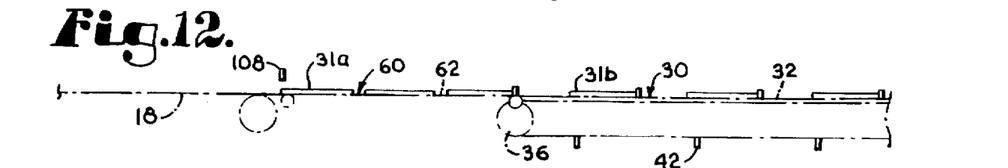
FIG. 12 shows the first unit of containers completely received onto the transfer conveyor and the loading conveyor having a second unit of containers in place.

Containers 31 are received by transfer conveyor 60 operating at low speed until, as illustrated in FIG. 12, the leading container 31a on the transfer conveyor 60 reaches the electronic eye 108. When electronic eye 108 detects the leading container 31a, controller 104 activates machine conveyor motor 23, which moves machine conveyor 22 at its normal work speed. Substantially simultaneously with activation of motor 23, the low speed clutch 82 disengages low speed drive 76 and high speed clutch 93 engages high speed drive 90. Containers 31 are then moved by transfer conveyor 60 at high speed to machine conveyor 22, which is moving at a speed substantially corresponding to the high conveyor speed. Again, some variance in the speeds of conveyors 22 and 60 may be desirable under certain circumstances and, thus, such variance is within the ambit of the invention.

Once containers 31 have been moved from transfer conveyor 60 to machine conveyor 22, normal operation of packing machine 10 occurs. In the preferred embodiment, containers are placed on the lower web 18 of packaging material which presents the surface of machine conveyor 22. The containers are moved to sealing station 20 intermittently in multiples of six at a time, as illustrated in FIG. 2. Upper web 14 of packaging material is fed into sealing die 20 and the die is intermittently closed to form the final package, which includes container 31 vacuum sealed in an air tight condition with the upper and lower webs of material. The packages are then moved to separating station 21 where they are separated and ultimately unloaded from the machine.

It is to be understood that containers 31 are moved from transfer conveyor 60 onto the machine conveyor 22 simultaneously with advancement of conveyor 22 during normal operation of machine 10. This movement is followed by an appropriate dwell time as containers entering sealing station 20 are evacuated and formed into a final package. This cessation of movement of machine conveyor 22 causes high speed clutch 93 to disengage the high speed drive 90 of transfer conveyor 60 and low speed clutch 82 to engage the low speed drive 76 so that the speed of the transfer conveyor will again approximately match that of loading conveyor 30. It is important to understand, of course, that even though machine conveyor 22 actually halts movement for a brief interval and transfer conveyor 60 alternates between low and high speeds, loading conveyor 30 is operating continuously at its loading speed.

As illustrated in FIGS. 8 through 13, apparatus 24 is designed to accommodate a total of six containers in one group or unit comprising two side-by-side rows of three each. While only three containers of the unit are visible on the conveyors in any one Figure, it is to be understood that another row of three is positioned adjacent the three shown on the opposite side of push bar 43. This unit number has been selected for purposes of illustration because in the preferred embodiment sealing station 20 includes a six cavity die for sealing six packages simultaneously. The invention is not restricted to handling any particular number of containers or packages.

Figure 13:
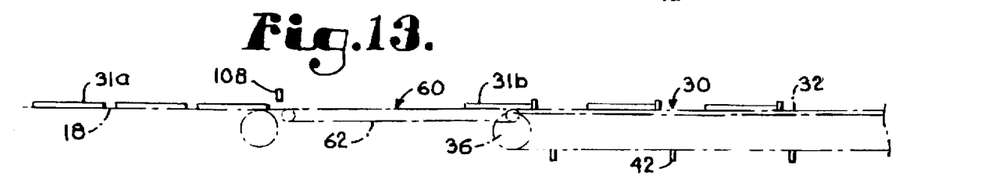
FIG. 13 shows the first complete unit of containers at the machine and the transfer conveyor being driven at the low speed to receive the first container of the second unit from the loading conveyor.

Conveyor 60 is operated at its predetermined low speed until a total of six containers have been moved by loading conveyor 30 onto the transfer conveyor 60, as illustrated in FIG. 12. When this occurs, the leading edge of leading container 31a of the first unit will pass beneath electric eye 108 thereby sending a signal to controller 104 to activate machine conveyor motor 23. This in turn engages the high speed drive 90 of transfer conveyor 60, as previously described, thereby moving the first unit of six containers onto the lower film web 18 for advancement by machine conveyor 22 as illustrated in FIG. 13. This transfer occurs before the lead container 31b in the next trailing unit of six moving along loading conveyor 30 reaches the leading edge of the transfer conveyor. By the time the leading container 31b of the second unit of six reaches the transfer conveyor, it will be under the influence of low speed drive 76 so that it is travelling at a predetermined low speed to receive containers 31 from conveyor 30, as illustrated in FIG. 13. A second unit of six containers is then moved onto transfer conveyor 60 at which time electric eye 108 will again sense the leading edge of container 31B and signal controller 104 to activate the machine conveyor 23 and the high speed drive 90 of transfer conveyor 60, repeating the container transfer procedure.

Figure 14:
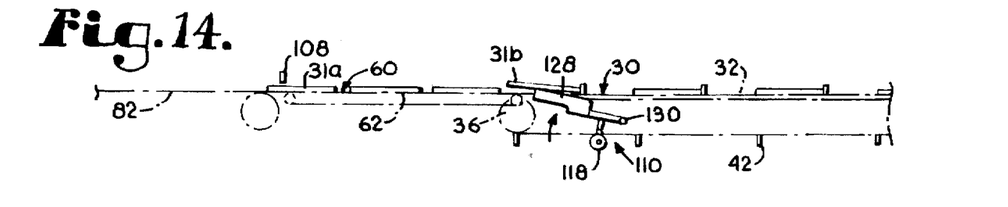
FIG. 14 illustrates an alternative embodiment of the apparatus of the present invention employing a lift mechanism at the rear end of the loading conveyor operable to lift the leading edge of the first container of the second unit above the leading end of the transfer conveyor so that movement of the transfer conveyor at the high speed does not alter the spacing of the following unit of containers on the transfer conveyor.
Figure 15:
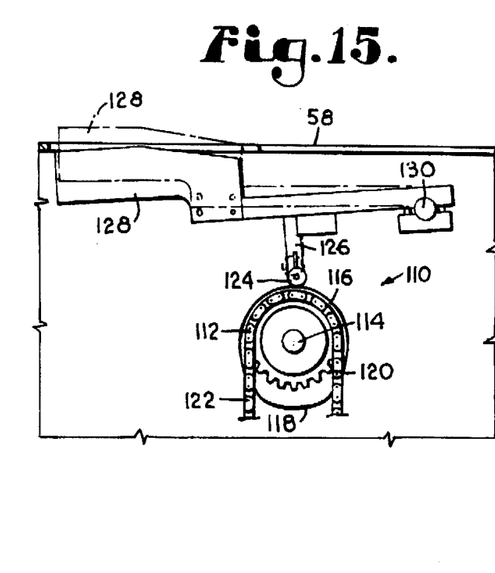
FIG. 15 is a enlarged fragmentary side elevational view of the lift mechanism illustrated in the alternative embodiment of FIG. 14 showing details of construction and also illustrating, in phantom lines, the manner of operation of the mechanism.

Due to limitations resulting from the speed of machine conveyor 22, in some applications it may not be possible to complete the cycle of transfer conveyor 60 before the leading container 31b of the next trailing unit reaches the leading portion of the transfer conveyor 60. To accommodate such circumstances, an alternative embodiment of apparatus 24, depicted in FIGS. 14 and 15, is employed. This alternative embodiment incorporates a lift mechanism 110 at the rear portion 37 of loading conveyor 30.

Referring to FIG. 15 in greater detail, lift mechanism 110 includes a cam wheel 112 carried on a cam shaft 114 for rotation in a substantially vertical plane. Shaft 114 includes a perimeter rim 116 having a portion being outwardly radially projected to form a camming surface 118. Cam shaft 114 includes a cam sprocket 120 securely mounted thereto and being operably coupled with a drive chain 122, which is engaged to a cam gear (not shown) on drive shaft 47. A cam follower wheel 124 contacts rim 116 and is carried by a vertical bar 126 positioned above wheel 112. Bar 126 supports a lift arm 128 which is pivotally mounted to loading station 26 by a bolt 130. While only one lift mechanism 110 is shown, it is to be understood that a plurality of such mechanisms would normally be employed, all mounted on shaft 114 and driven by drive chain 122. Lift mechanisms 110 are preferably mounted below cover plates 58 so that lift arms 128 are disposed between chains 32. As shown in FIG. 2, at least one slot 132 is defined in each plate 58 to accommodate movement of arms 128 above the plane of plates 58.

In operation, shaft 47 imparts continuous rotational movement to cam wheel 112. As the wheel rotates, follower 124 contacts rim 116, thereby maintaining lift arms 128 below plates 58. When follower 124 contacts camming surface 118, lift arms 128 are raised through slots 132 and contact the leading containers 31b of the following unit, as illustrated in FIG. 14. The containers 31b are thus slightly lifted by arms 128 so that their leading edge does not contact transfer conveyor 60. Loading conveyor 30 continues to move the containers 31b forward as they slide up the slightly inclined lift arms 128 to extend above transfer conveyor. This allows additional time for the transfer conveyor to complete its cycle, moving the leading unit of six containers at high speed to machine conveyor 22 while the next unit of six advances. As the cam wheel 112 continues to rotate, cam follower 124 passes over camming surface 118 back onto perimeter rim 116. This lowers lift arms 128 back into slots 132, thereby allowing containers 31b to contact transfer conveyor 30 which has returned to low speed.

As is readily apparent from the above, the apparatus of the present invention provides a simple yet highly efficient means for continuously loading an intermittent operating machine. The present invention benefits from the convenience of continuous loading while preserving the advantages inherent in the intermittent system. The operator or operators of a machine equipped with the present apparatus need only supply a continuous stream of containers onto the loading conveyor without encountering the complexities associated with syncopated, rapid mass loading. The continuous feed of products allows the intermittent machine to operate at its maximum rate, unhindered by human loading limitations. Applicant's invention, therefore, not only provides the intermittent vacuum packaging system user with a loading system which is more easy to operate than those existing in the art, but also provides the user with a system which operates faster and more efficiently.

While a vacuum packaging application is expressly disclosed, it is fully anticipated that the present invention may be utilized with any intermittently operating system that would benefit in terms of efficiency or convenience from continuous loading. Such applications are clearly within the scope of the present invention.

From the foregoing it is apparent this invention is one well-adapted to obtain all the ends and objectives set forth herein along with other advantages which are obvious to the invention.

It is to be understood that certain features and subcombinations are useful and may be employed without reference to other aspects of the invention. This is contemplated by the disclosure and is within the scope of the claims.

Since many possible embodiments may be made of the present invention without departing from its scope, it is understood that all matters set forth herein and shown in the accompanying drawings are to be interpreted as illustrative only and not in a limiting sense.

The following is claimed:

1. A loading apparatus for continuously supplying product to a machine which intermittently performs work on at least one said product, said machine having a work station and a machine transporter driven by a machine motor for intermittently moving said product through said work station, said apparatus comprising:

a first moving surface for receiving a continuous supply of said product;

a continuous drive motor operably coupled with said first moving surface for driving said first moving surface at a substantially constant loading speed;

a second moving surface adjacent said first moving surface for receiving said product from said first moving surface and intermittently moving said product to said transporter;

a low speed drive engaged to said continuous drive motor and operably coupled to said second moving surface for driving said second moving surface at a predetermined low speed to receive said product from said first moving surface;

a high speed drive adapted to engage said machine motor and operably coupled to said second moving surface for driving said second moving surface at a high speed relatively greater than said low speed to transfer said product to said machine; and a controller for controlling said low speed and high speed drives in sequence so that said low speed drive is activated to move said second moving surface at said low speed when receiving said product from said first moving surface, and said high speed drive is activated to transfer said product from said second moving surface to said machine transporter, whereby said product may be continuously supplied to said first moving surface and periodically transferred by said second moving surface to said machine transporter without interrupting said continuous supply of said product.

2. The apparatus of claim 1, wherein said first moving surface is a loading conveyor.

3. The apparatus of claim 2, wherein said second moving surface is a transfer conveyor.

4. The apparatus of claim 3, wherein said machine transporter is a machine conveyor for intermittently conveying said product from said transfer conveyor through said work station at a work speed substantially corresponding to said high speed.

5. The apparatus of claim 4, wherein said low speed drive includes a low speed clutch for selectively engaging said low speed drive.

6. The apparatus of claim 5, wherein said high speed drive includes a high speed clutch for selectively engaging said high speed drive.

7. The apparatus of claim 6, wherein said controller includes at least one electronic eye and associated circuitry for engaging and disengaging said low speed and high speed drives, said electronic eye being disposed at said transfer conveyor to detect the presence of said product, whereby said low speed drive is disengaged and said high speed drive is engaged to move said product to said machine conveyor at said high speed.

8. The apparatus of claim 7, wherein said controller disengages said high speed drive and engages said low speed drive after said product has been conveyed to said machine conveyor by said transfer conveyor, whereby said transfer conveyor is driven at said low speed for receiving said product from said loading conveyor.

9. The apparatus of claim 8, wherein said loading conveyor includes a plurality of chains being spaced apart in respective parallel relation to define spaces therebetween, each said chain having an upper rung, a lower rung, a front end and a rear end, said upper rung of each said chain being adapted for movement from said rear end to said front end.

10. The apparatus of claim 9, wherein each said chain includes a plurality of flights pivotally secured thereto and being equally spaced apart for pushing said product along said loading conveyor.

11. The apparatus of claim 10, further comprising at least one lift mechanism mounted below said upper rung at said front end of said loading conveyor, said mechanism including a cam wheel having a perimeter rim for rotation in a vertical plane, said wheel presenting a camming surface on said rim, a cam follower positioned above said wheel in contact with said rim, and a vertical bar carrying said wheel and supporting a lift arm, said lift arm being disposed within one of said spaces and being adapted for vertical movement in response to rotation of said wheel between a lowered position, wherein the lift arm is maintained below said upper rung, and a raised position, wherein said lift arm is raised above said upper rung for at least partially lifting said product.

12. The apparatus of claim 11, wherein said cam wheel is operably engaged with said continuous drive for rotating said wheel.

13. The apparatus of claim 12, wherein said machine is an intermittently operating vacuum packaging machine operable to simultaneously vacuum seal a plurality of said products arranged in longitudinal units of two or more.

14. A continuous loading machine which intermittently performs work on product, said machine comprising:

a loading station including a loading conveyor for receiving a continuous supply of said product and a continuous drive motor operably coupled to said loading conveyor for moving said loading conveyor at a substantially constant loading speed;

a work station for intermittently performing work on said product, said work station including a work performing apparatus, a machine conveyor for transporting said product through said work station, and a machine conveyor motor operably coupled to said machine conveyor for driving said machine conveyor at a work speed;

a transfer station positioned intermediate said loading station and said work station, said transfer station including a transfer conveyor, a low-speed drive engaged to said continuous drive motor for moving said transfer conveyor at a low speed for receiving product from said loading conveyor, and a high speed drive engaged to said machine conveyor motor for moving said transfer conveyor at a high speed relatively greater than said low speed for transferring said product to said machine conveyor; and a controller for coordinating the operation of said stations such that said low speed drive is activated to move said transfer conveyor at said low speed when receiving said product from said loading conveyor at said loading speed, and said high speed drive is activated to convey said product from said transfer conveyor at said high speed to said machine conveyor moving at said work speed, whereby said product may be continuously loaded onto said loading conveyor and periodically transferred by said transfer conveyor to said machine conveyor without interrupting said continuous supply of said product.

15. The apparatus of claim 14, wherein said low speed drive includes a low speed clutch for selectively engaging said low speed drive, whereby said transfer conveyor is driven at said low speed to receive said product from said loading conveyor moving at said loading speed.

16. The apparatus of claim 15, wherein said high speed drive includes a high speed clutch for selectively engaging said high speed drive, whereby said transfer conveyor moves said product at said high speed to said machine conveyor moving at said work speed.

17. The apparatus of claim 16, wherein said controller includes at least one electronic eye and associated circuitry for engaging and disengaging said low speed and high speed drives, said electronic eye being disposed at said transfer conveyor to detect the presence of said product, whereby said low speed drive is disengaged and said high speed drive is engaged to move said product to said machine conveyor at said high speed.

18. The apparatus of claim 17, wherein said loading conveyor includes a plurality of chains being spaced apart in respective parallel relation to define spaces therebetween, each said chain having an upper rung, a lower rung, a front end and a rear end, said upper rung of each said chain being adapted for movement from said rear end to said front end.

19. The apparatus of claim 18, wherein each said chain includes a plurality of flights pivotally secured thereto and being equally spaced apart for pushing said product along said loading conveyor.

20. The apparatus of claim 19, further comprising at least one lift mechanism mounted below said upper rung at said front end of said loading conveyor, said mechanism including a cam wheel having a perimeter rim for rotation in a vertical plane, a cam follower positioned above said wheel and contacting said rim, and a vertical bar carrying said wheel and supporting a lift arm, said lift arm being disposed within one of said spaces and being adapted for vertical movement in response to rotation of said wheel between a lowered position, wherein the lift arm is maintained below said upper rung, and a raised position, wherein said lift arm is raised above said upper rung for at least partially lifting said product.

21. The apparatus of claim 20, wherein said cam wheel is operably engaged with said continuous drive motor for rotating said wheel.

22. The apparatus of claim 21, wherein said machine conveyor is a lower film web.

23. A loading apparatus for continuously supplying product to a machine which intermittently performs work on at least one said product, said machine having a work station and a machine transporter for intermittently moving said product through said work station, said apparatus comprising:

a first moving surface for transporting a continuous supply of said product, said first moving surface having a front end and a rear end;

a continuous drive operably coupled with said first moving surface for driving said first moving surface at a substantially constant loading speed;

a second moving surface adjacent said first moving surface for receiving said product from said first moving surface and intermittently moving said product to said transporter, said second moving surface having a receiving portion adjacent said front end of said first moving surface;

a low speed drive operably coupled to said second moving surface for driving said second moving surface at a predetermined low speed to receive said product from said first moving surface;

a high speed drive operably coupled to said second moving surface for driving said second moving surface at a high speed relatively greater than said low speed to transfer said product to said machine;

product lifting means operably coupled to said continuous drive and mounted at said from end of said first moving surface for selectively lifting said product on said first moving surface to suspend said product over said receiving portion of said second moving surface, and lowering said product onto said second moving surface at predetermined intervals; and a controller for controlling said low speed and high speed drives in sequence so that said low speed drive is activated to move said second moving surface at said low speed when receiving said product from said first moving surface, and said high speed drive is activated to transfer said product from said second moving surface to said machine transporter, whereby said product may be continuously supplied to said first moving surface and periodically transferred by said second moving surface to said machine transporter without interrupting said continuous supply of said product.

24. The loading apparatus of claim 23, wherein said product lifting means comprises at least one lift mechanism, each said lift mechanism including a cam wheel having a perimeter rim for rotation in a vertical plane, said wheel presenting a camming surface on said rim, a cam follower positioned above said wheel in contact with said rim, and a vertical bar carrying said wheel and supporting a lift arm, said lift arm being adapted for vertical movement in response to rotation of said wheel between a lowered position, wherein said lift arm is maintained below said first moving surface, and a raised position, wherein said lift arm is raised above said first moving surface for at least partially lifting said product thereon.

25. A loading apparatus for supplying articles to a machine that intermittently performs work on said articles, said machine including a work station at which said work is performed, a machine conveyor for intermittently transporting said articles to said work station, a machine conveyor drive means for intermittently driving said machine conveyor at a work speed to move said articles to said work station, said loading apparatus comprising:

a loading conveyor on which said articles are received;

a loading conveyor drive means for continuously driving said loading conveyor at a loading speed;

a transfer conveyor for continuously receiving said articles from said loading conveyor and intermittently transporting said articles to said machine conveyor;

means for connecting said transfer conveyor to said loading conveyor drive means to normally drive said transfer conveyor at a first speed directly proportional to said loading speed; and means for connecting said transfer conveyor to said machine conveyor drive means such that when said machine conveyor drive means intermittently drives said machine conveyor at said work speed, said transfer conveyor is driven at a second speed directly proportional to said work speed.

* * * * *